Figure 1:
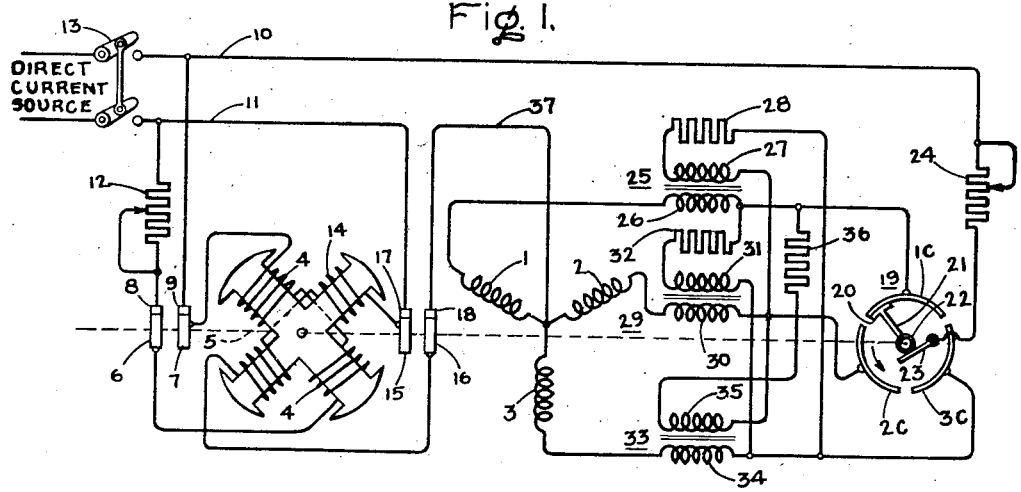

Jan. 1, 1952

A. SCHMIDT, JR 2,581,208

VARIABLE-SPEED ELECTRIC MOTOR

Filed Feb. 15, 1950

Inventor:
August Schmidt Jr,
by Ernest C. Britton
His Attorney.

Patented Jan. 1, 1952

2,581,208

UNITED STATES PATENT OFFICE 2,581,208

VARIABLE-SPEED ELECTRIC MOTOR

August Schmidt, Jr., Schenectady, N. Y., assignor to General Electric Company, a corporation of New York Application February 15, 1950, Serial No. 144,290

14 Claims. (Cl. 172—36)

1

This invention relates to variable speed electric motors and more particularly to an arrangement whereby the speed of an electric motor of the synchronous type may be varied when energized from a source of direct current electric energy.

Conventional direct current commutator type motors, though frequently used to drive a load whose speed must be varied, are not suitable for use in certain applications where the atmosphere is polluted by dust, smoke and other foreign particles which may collect on the commutator and eventually cause improper operation or even flashover of the commutator. Explosive atmospheres may constitute a hazard for direct current commutator type motors since sparking at the brushes is likely to occur under widely varying load and speed conditions and the expense of enclosing the motor or of maintaining a pressurized spark inhibiting atmosphere around the commutator may be prohibitive. Furthermore, certain inherent limitations of the commutator type motor serve to limit the maximum size of such a motor. For instance, the close spacing between adjacent commutator bars limits the voltage that can be applied at the brushes, and if the current supplied to commutator type motors is high in magnitude, commutation will prove difficult. Furthermore, maintenance of commutator type motors frequently proves to be costly and may necessitate time consuming shutdowns. These limitations which are characteristic of direct current commutating type motors are not characteristic of alternating current synchronous type motors whose speed is dependent upon the frequency of the source of power. Obviously, it would be desirable to provide a motor which would be free of the many objectionable features of the direct current commutator type motor and which would also be a variable speed device.

An object of my invention is to provide a variable speed motor which is practicable for large capacity application.

Another object of my invention is the provision of an improved variable speed motor wherein the hazard due to brush sparking is substantially eliminated.

Still another object of my invention is to provide a variable speed motor which does not incorporate conventional commutator means so as to avoid the difficulties which normally attend an accumulation of foreign matter on the surfaces of the commutator.

A further object of my invention is to facilitate the transfer of current from one winding of the armature of an electric motor to another winding thereof without using closely spaced commutator segments required in conventional commutator type motors.

A still further object of my invention is the

2 provision of variable reactance means in series with each motor armature lead conductor for maintaining the current in each winding of the armature at a relatively low value for an appreciable time after the current in such winding has decayed to a low value without impeding the build-up of current in the winding next energized.

In accordance with the invention, a synchronous type motor having a field winding and a plurality of armature windings is provided with means controlled by rotation of the motor for successively energizing the armature windings from a source of direct current energy, and a variable reactor in series with each of the power leads is used to facilitate the transfer of current from one armature winding to another such winding by the distributor. Preferably the reactance of the variable reactor is controlled by a predetermined electrical quantity which varies in accordance with the rotation of the motor. If desired, the synchronous type motor may be provided with a commutating field winding similar to commutating windings used in conjunction with direct current machines.

Figure 2:
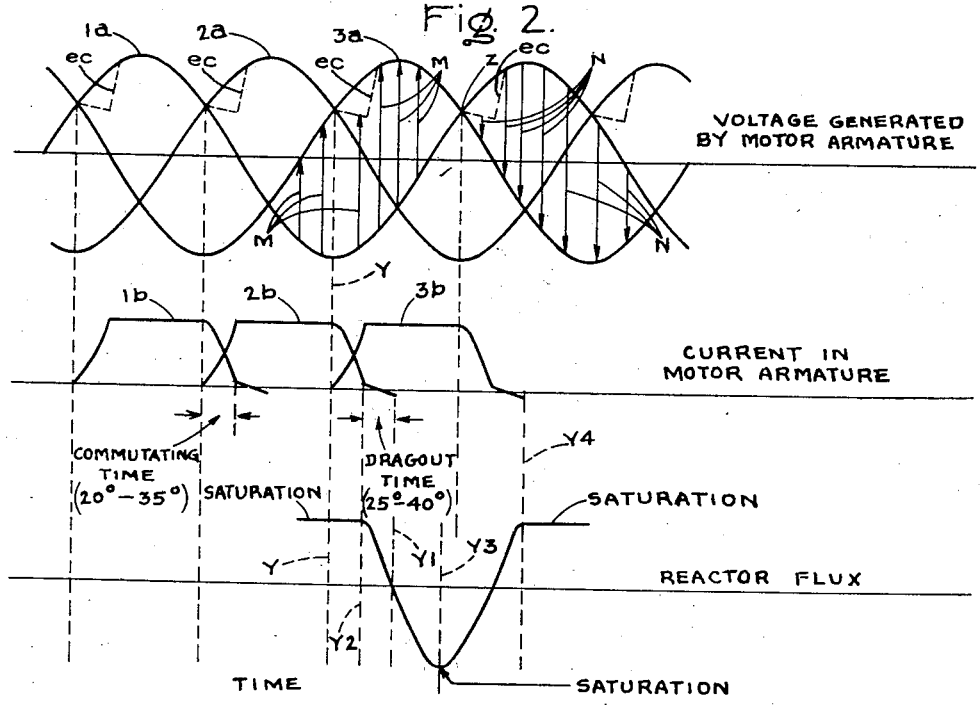

For a better understanding of my invention, reference may be had to the accompanying drawings in which Fig. 1 is a schematic motor arrangement embodying my invention; and in which Fig. 2 is a group of curves drawn to the same time scale for facilitating an understanding of some of the voltage, current, and flux relationships which characterize the arrangement of Fig. 1.

In Fig. 1 a synchronous type motor is represented as having a Y-connected armature or stator winding comprising the phase windings 1, 2, and 3. The term phase winding is used even though the motor comprising my invention is energized from a direct current source of potential. The motor is provided with a rotating field winding 4 which is mounted on the schematically represented shaft 5. The terminals of field winding 4 are brought out to schematically represented slip rings 6 and 7 which cooperate with brushes 8 and 9 to energize field winding 4 from the direct current conductors 10 and 11 through a field adjusting device 12. Conductors 10 and 11 are energized through suitable means, such as the switch 13 from the direct current source.

While not essential to the invention, it may be desirable to utilize a commutating winding such as is indicated at 14. This winding is provided with terminals which are connected to slip rings 15 and 16. As will be obvious from Fig. 1, the brushes 17 and 18 which cooperate respectively with slip rings 15 and 16 are connected in series with conductor 11 so that the commutating winding 14 is energized at all times when the switch 13 is closed in accordance with the flow of current through conductor 11.

For the purpose of sequentially energizing the phase windings 1, 2, and 3 of the motor armature, the distributor generally indicated by the numeral 19 may be used. As schematically represented, device 19 comprises a plurality of segmental conductors 1c, 2c, and 3c which are respectively connected to the windings 1, 2, and 3 of the motor armature. Cooperatively disposed with respect to segmental members 1c, 2c, and 3c is a conducting segment 20 which is mounted on a conducting arm 21 which, in turn, is rotated by the shaft 5. As is indicated in Fig. 1, a contact 22 is secured to the shaft 5 and hence arm 21 and conducting segment 20 rotate in accordance with rotation of the shaft 5 so as to engage the segmental members 1c, 2c, and 3c in sequence. Suitable means should be used to insulate contact 22 from shaft 5. In order that the windings 1, 2, and 3 will be energized in the proper sequence for the conditions illustrated in Fig. 2, rotation of segment 20 should be counterclockwise as is indicated. Energy is supplied to segmental member 20 through conducting arm 21 by means of a contact 23 which engages the contact 22. Contact 23 is energized from conductor 10 through variable resistor 24. It will be obvious that means other than distributor 19 could be used, such as a plurality of cam operated contacts controlled in accordance with rotation of shaft 5.

For the purpose of aiding interruption of the flow of current between rotatable segmental member 20 and a cooperating fixed segmental contact such as 1c when the segment 20 is rotated counterclockwise by an amount sufficient to cause the trailing edge of this contact to disengage the fixed segmental member 1c, the saturable reactor 25 is used. Saturable reactor 25 is provided with a main coil 26 which is in series with the phase winding 1, and a control winding 27 is used to control the impedance of reactor 25 so that the impedance of the reactor will be appreciably increased at a proper time to facilitate commutation. As will be more fully explained hereinafter, reactor 25 effectively maintains current flow in phase winding 1 at low instantaneous values for an appreciable length of time of the order of 25–40 electrical degrees so that timing of the particular instant at which the trailing edge of the rotatable segment 20 separates from one of the fixed contact segments, such as 1c, need not be precisely predetermined. As is also shown in Fig. 1 and as will be more fully explained hereinafter, control winding 27 of saturable reactor 25 is energized by the voltage generated by the phase windings 2 and 3, and in order that the current in control winding 27 may be of the proper magnitude, a current limiting resistor 28 is connected in series with control winding 27. Like phase winding 1, phase winding 2 is provided with a saturable reactor 29 provided with a main winding 30 and a control winding 31. Energy for control winding 31 is supplied in accordance with the voltage generated in phase windings 1 and 3 through a current limiting resistor 32. Likewise, phase winding 3 is arranged in series with a saturable reactor 33 having a main winding 34 and a control winding 35. Control winding 35 is energized by the voltage generated in phase windings 1 and 2 through a current limiting resistor 36.

When switch 13 is closed, field winding 4 is energized and current begins to flow through conductor 10, device 19, the particular phase winding, such as 1, as determined by the initial position of rotatable contact 20, to the neutral of the Y-connected armature windings, through conductor 37, the commutating winding 14 and back to the source through conductor 11. The torque exerted due to the interaction of flux between field winding 4 and a phase winding such as 1 will cause the initial rotation of the rotor in the counterclockwise direction, and after a predetermined rotation thereof, phase winding 2 will be energized through constants 20 and 2c and further rotation will result in the energization of phase winding 3. As in the case of conventional direct current motors, the speed of rotation is determined by the voltage applied to the armature phase windings 1, 2, and 3 and, as shown in Fig. 1, this applied voltage may be controlled by suitable adjustment of control resistor 24. Also, as in the case of the direct current commutator type motor, the speed of rotation can be controlled by adjusting the field strength of field winding 4. As is shown in Fig. 1, this adjustment is accomplished by means of the variable resistor 12. Thus, the speed of the motor is increased when the field strength of winding 4 is reduced or when the voltage applied to the phase windings 1, 2, and 3 is increased as is well known.

A better understanding of the operation of saturable reactors 25, 29, and 33 may be had by referring to Fig. 2. In Fig. 2, the curves 1a, 2a, and 3a represent the voltage generated by the phase windings 1, 2, and 3 for given speed and field conditions of the motor. These voltages are displaced from each other by 120 electrical degrees, as in a conventional three-phase synchronous type motor. Fig. 2 also shows the currents in the windings 1, 2, and 3 by means of the curves 1b, 2b, and 3b. The commutating time will vary with the motor load. As is indicated in Fig. 2, it may have a value of the order of 20–35 electrical degrees at rated load. The current dragout time of the reactors 25, 29, and 33 is somewhat greater than the commutating time and may be 25–40 electrical degrees, as has already been stated. The lower portion of Fig. 2 shows the flux conditions in only one of the reactors 25, 29, or 33, and since all of the curves of Fig. 2 are drawn to the same time scale, it will be understood that the reactors 25, 29, and 33 are constructed so that they are saturated when the current in the associated phase winding is at its maximum value so that the impedance of each of the reactors is at a minimum value when the motor is drawing an operating current from its source of supply. At the beginning of a commutation period, as is indicated by the vertical dotted time line Y, for example, the current in phase winding 2, as is indicated by curve 2b, begins to decrease and the current in phase winding 3, as is indicated by curve 3b, begins to increase from a zero value toward its maximum value so that the current drawn from the source is substantially constant at all times during the commutation period Y–Y2. During the period from the time indicated by the dotted line Y2 to that indicated by the dotted line Y1, the flux in the reactor 29 diminishes to zero. Since the control winding 31 of reactor 29 is energized by the algebraic sum of the instantaneous voltages generated in windings 3 and 1, as represented by the arrows M, and because this voltage is used to establish flux which opposes the flux due to current in winding 30, reactor 29 will be demagnetized during the time between the dotted line Y2 and the dotted line Y1. This demagnetizing action renders reactor 29 unsaturated and hence has the effect of limiting the current to a relatively low value during the time between that indicated by the dotted line Y2 and the dotted line Y1 so that contact segment 20 may safely interrupt current by moving away from segment 2c at any time during the time from Y2 to Y1, which, as is indicated, may be of the order of 25–40 electrical degrees. Since the control winding 31 is connected with suitable polarity to oppose the flux established by the current in winding 30 during the commutating period of winding 2, winding 31 will magnetize reactor 29 in the reverse direction so that its flux changes from a zero value at time Y1 to a maximum value in the reverse direction at time Y3. As the algebraic sum of the voltages generated by phase windings 3 and 1 is diminished to zero at point Z and changes polarity thereafter, the reactor 30 is again saturated at the time indicated by the dotted line Y4. This voltage change is shown in Fig. 2 by the arrows N which are reversed in polarity from the voltages represented by the arrows M. Thus, with the reactor 29 saturated, as is indicated at time Y4, subsequent current build-up in this winding is facilitated since the impedance of reactor 29 will be small due to this presaturating action of winding 31. Thus, the voltages, such as M and N, are dependent upon the speed and position of the rotor relative to the various armature windings.

The above described relationships for reactor 29, of course, apply in the case of reactors 25 and 33 and, from the description above, it will be understood that the effect of the reactors 25, 29, and 33 is to aid the decay of current in the corresponding one of the phase windings 1, 2, and 3 and that the reactors afford a drag-out time so as to hold the current to a minimum low value, as indicated between times Y2 and Y1, so that the timing of the instant when rotatable segment 20 respectively separates from the fixed segments, such as 1c, 2c, and 3c, need not be precisely predetermined. Furthermore, it will be understood that due to the change in polarity of the voltage applied to the various control windings, such as 31, as is indicated at N and M, a degree of presaturation is accomplished which facilitates the build-up of current in windings 1, 2, and 3.

While the device 19 is schematically represented as a distributor, it will be understood that for large capacity motors for which my invention is particularly applicable, it may be desirable to arrange a number of segments, such as 1c, 2c, and 3c, in parallel if the current, though limited as explained above between the times designated at Y2 and Y1, is of substantial magnitude. Furthermore, if the voltage between the rotatable contact segment 20 and its cooperating fixed contact segments 1c, 2c, and 3c is of appreciable magnitude, it will be possible to arrange two or more devices such as 19 in series and thereby to facilitate interruption of the current after the transfer of current from one winding to another winding during the time between Y2 and Y1.

The dotted curves ec represent the average output voltage for any two phases concerned during the commutating periods.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. An electric motor comprising a field winding, a plurality of armature windings, means for periodically energizing each of said armature windings in a predetermined sequence from a source of direct current electric energy, and variable reactance means in series with each of said armature windings, and means for saturating each of said reactance means prior to the initiation of the flow of current in the associated armature winding.

2. An electric motor comprising a field winding, a plurality of armature windings, means for energizing and for subsequently de-energizing each of said armature windings in a predetermined sequence from a source of direct current electric energy, variable reactance means in series with each of said armature windings, and means for increasing the reactance of each of said reactance means just prior to the cessation of the flow of current in the associated armature winding.

3. An electric motor comprising a field winding, a plurality of armature windings, means controlled by the rotation of said motor for energizing and for subsequently de-energizing each of said armature windings in a predetermined sequence from a source of direct current electric energy, variable reactance means in series with each of said armature windings, and means for saturating each of said reactance means prior to the initiation of the flow of current in the associated armature winding, said last-mentioned means being effective to increase the reactance of the associated reactance means just prior to the cessation of the flow of current in the associated armature winding.

4. An electric motor comprising a field winding, a plurality of armature windings, means controlled by the rotation of said motor for periodically energizing each of said armature windings in a predetermined sequence from a source of direct current electric energy, variable reactance means in series with each of said armature windings, and means for controlling the reactance of each of said reactance means, said last named means being connected with said armature windings so that the current therethrough sequentially saturates each of said reactance means prior to the initiation of the flow of current in the associated armature winding.

5. An electric motor comprising a field winding, a plurality of armature windings, means responsive to operation of the motor for energizing said armature windings in a predetermined sequence, variable reactance means in series with each of said armature windings, and means responsive to instantaneous voltages in said armature windings for controlling the reactance of each of said reactance means, said last named means being interconnected with said armature windings so that the flow of current therethrough is decreased substantially so as to increase the reactance of the associated reactance means during the period of the decay of current in the associated armature winding.

6. An electric motor comprising a field winding, a plurality of armature windings, means responsive to operation of the motor for energizing and deenergizing said armature windings in a predetermined sequence, variable reactance means in series with each of said armature windings, and control means for each of said reactance means, said control means being energized by an electrical quantity of said armature which is characterized by a predetermined polarity during the decay of current in the associated reactance means and armature winding so as to increase the reactance of the associated reactance means and which is characterized by an opposite polarity after the cessation of current flow in such reactance means and winding so as to decrease the reactance of the associated reactance means.

7. An electric motor comprising a field winding, a plurality of armature windings, means responsive to operation of the motor for periodically energizing each of said armature windings in a predetermined sequence from a source of direct current energy, variable reactance means in series with each of said armature windings, each of said reactance means being saturable in response to the flow of current in excess of a predetermined value from said source to the associated armature winding, and control means for each of said reactance means, said control means being interconnected with said armature so that the flow of current therethrough is decreased during the decay of current in the associated winding and reactance means.

8. An electric motor comprising a field winding, a plurality of armature windings, means responsive to operation of the motor for periodically energizing each of said armature windings in a predetermined sequence from a source of direct current energy, variable reactance means in series with each of said armature windings, each of said reactance means being saturable in response to the flow of current in excess of a predetermined value from said source to the associated armature winding, and control means for each of said reactance means, said control means being energized by an electrical quantity of said armature the instantaneous value of which varies in accordance with the rotation of the motor, and said control means being arranged to oppose the magnetizing effect on the associated reactance means due to the flow of current therethrough from said source during the decay of current flow in the associated reactance means.

9. An electric motor comprising a field winding, a plurality of armature windings, means responsive to operation of the motor for energizing said armature windings in a predetermined sequence from a source of direct current energy, variable reactance means in series with each of said armature windings, and control means for each of said reactance means, said control means being energized by a quantity which is a function of the instantaneous voltage generated in said armature windings and which effects saturation of the associated reactance means prior to the initiation of the flow of current in the associated armature winding.

10. An electric motor comprising a field winding, a three-phase Y-connected armature winding having its neutral interconnected with one terminal of a direct current source, distributor means responsive to operation of the motor for sequentially connecting and disconnecting the phases of said armature winding with the other terminal of said source of direct current electric energy saturable reactance means in series with each of said windings, and means for saturating each of said reactance means prior to the initiation of the flow of current in the associated winding.

11. An electric motor comprising a field winding, a three-phase Y-connected armature winding having its neutral interconnected with one terminal of a direct current source, distributor means responsive to operation of the motor for periodically connecting the phase windings of said armature winding with the other terminal of said source of direct current electric energy and for periodically deenergizing the phase windings, a saturable reactor for each of the phase windings, each of said reactors having a main winding in series with the associated one of the phase windings, and a control winding energized in accordance with a function of the instantaneous voltages generated by the other phase windings.

12. An electric motor comprising a field winding, a three-phase Y-connected armature winding having its neutral interconnected with one terminal of a direct current source, and distributor means responsive to operation of the motor for sequentially connecting the phases of said armature winding with the other terminal of said source of direct current electric energy, a saturable reactor in series with each phase winding of said armature winding, each of said reactors being saturated when the current in the associated phase winding is at a predetermined value, and means responsive to predetermined instantaneous voltages of said armature for increasing the reactance of the associated reactance means during the decay of current in the corresponding phase winding and the associated reactance means.

13. An electric motor comprising a main field winding, a commutating winding, a polyphase star-connected armature winding having its neutral interconnected with one terminal of a direct current source through said commutating winding, distributor means responsive to operation of the motor for sequentially connecting and disconnecting the phases of said armature winding with the other terminal of said source of direct current electric energy, saturable reactance means in series with each of said windings, and means for saturating each of said reactance means prior to the initiation of the flow of current in the associated winding.

14. An electric motor comprising a main field winding, a commutating winding, a polyphase star-connected armature having its neutral interconnected with one terminal of a direct current source through said commutating winding, distributor means responsive to operation of the motor for sequentially connecting and disconnecting the phases of said armature winding with the other terminal of said source of direct current electric energy, saturable reactance means in series with each of said windings, and means for increasing the reactance of each of said reactance means just prior to the interruption of the flow of current in the associated armature winding by said distributor means.

AUGUST SCHMIDT, JR.

REFERENCES CITED

The following references are of record in the file of this patent:

UNITED STATES PATENTS

| Number | Name | Date |
|---|---|---|
| 2,351,975 | Koppelmann | June 20, 1944 |